Dec. 10, 1968  W. J. HOLZKNECHT  3,415,558
METHOD AND APPARATUS FOR MANUFACTURING A PILE FABRIC
Filed Aug. 25, 1966  6 Sheets-Sheet 1
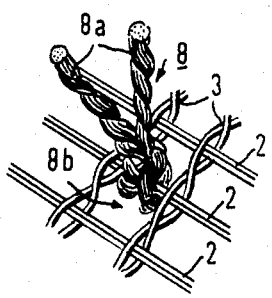
Fig.1.
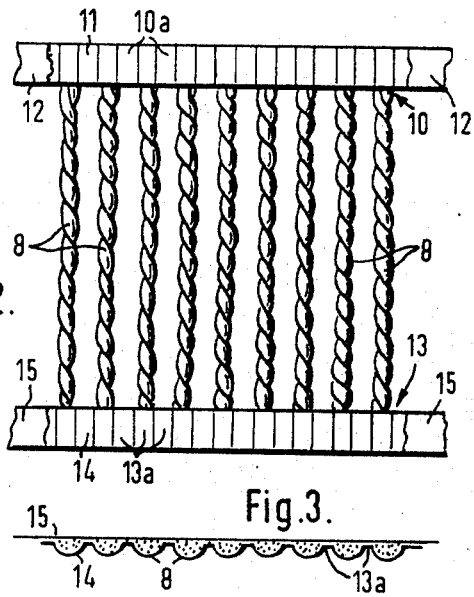
Fig.2.
Fig.3.
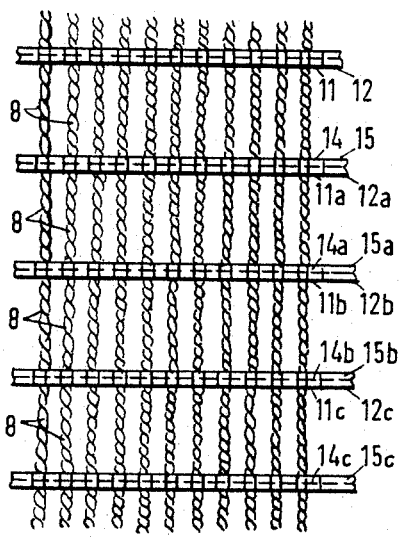
Fig.4.
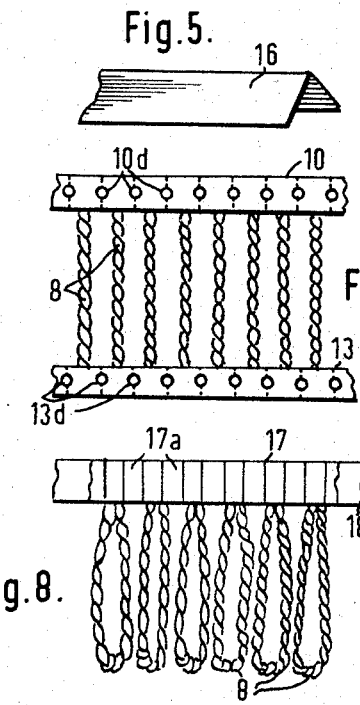
Fig.5.
Fig.6.
Fig.8.
INVENTOR:
WALTER JOHANN HOLZKNECHT
By Kurt Kelman
AGENT Dec. 10, 1968   W. J. HOLZKNECHT   3,415,558
METHOD AND APPARATUS FOR MANUFACTURING A PILE FABRIC
Filed Aug. 25, 1966   6 Sheets-Sheet 2
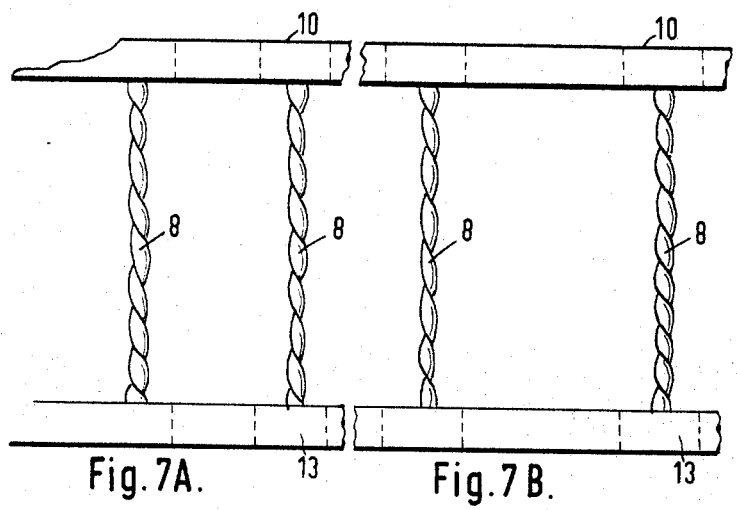
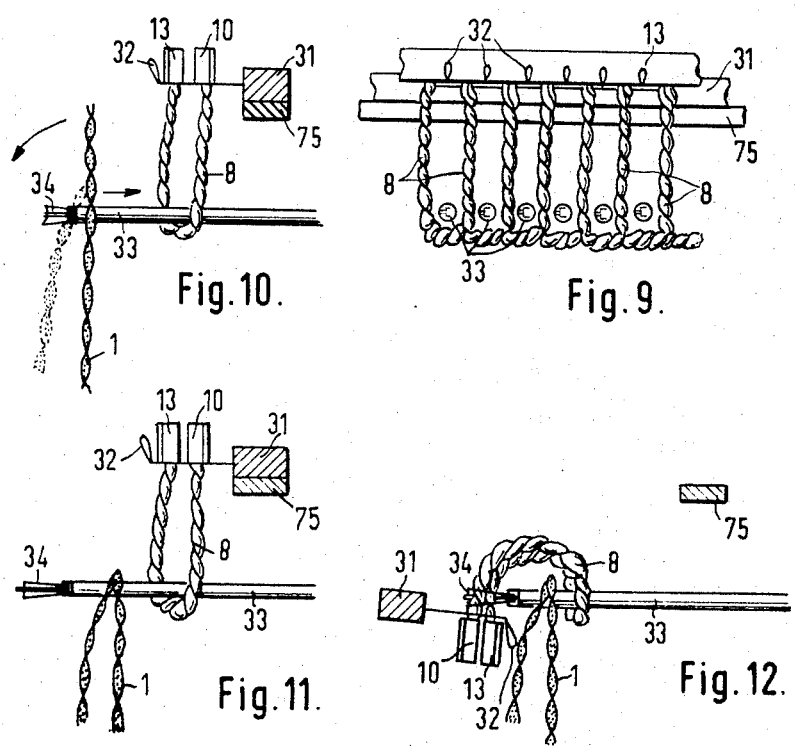
INVENTOR:
WALTER JOHANN HOLZKNECHT
By
Kurt Kelman
AGENT

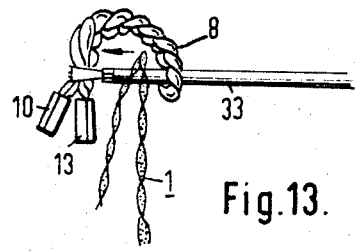
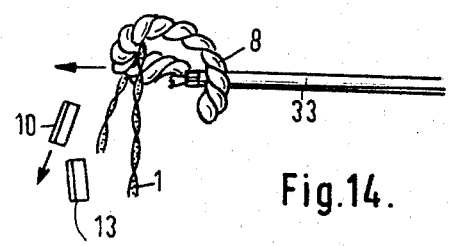
Fig.13.  Fig.14.
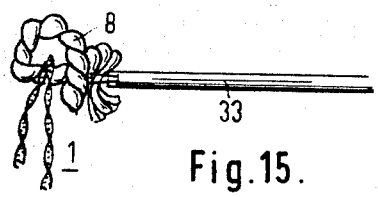
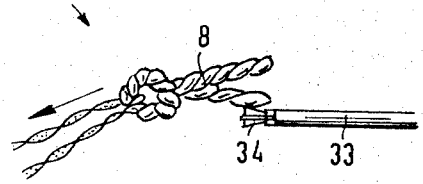
Fig.15.  Fig.16.
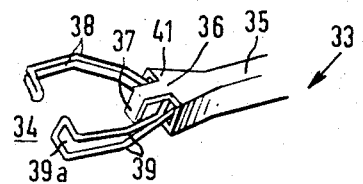
Fig.17.
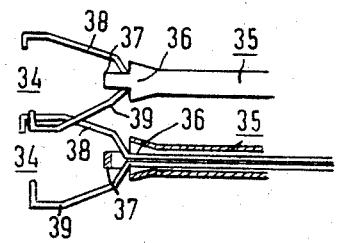
Fig.18.
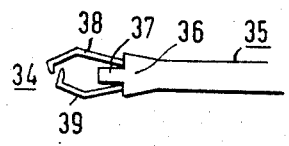
Fig.19.

INVENTOR:
WALTER JOHANN HOLZKNECHT
BY
Kurt Kelman
AGENT

Dec. 10, 1968  W. J. HOLZKNECHT  3,415,558
METHOD AND APPARATUS FOR MANUFACTURING A PILE FABRIC
Filed Aug. 25, 1966  6 Sheets-Sheet 6

INVENTOR:
WALTER JOHANN HOLZKNECHT
BY
Kurt Kelman
AGENT

United States Patent Office 3,415,558
Patented Dec. 10, 1968

3,415,558
METHOD AND APPARATUS FOR MANU-
FACTURING A PILE FABRIC
Walter Johann Holzknecht, Furstenfeldbruck, Germany, assignor to Pangafin Societe Anonyme Holding, Luxembourg, Luxembourg
Filed Aug. 25, 1966, Ser. No. 574,980
Claims priority, application Germany, Sept. 10, 1965,
H 57,140
15 Claims. (Cl. 289—1.5)

ABSTRACT OF THE DISCLOSURE

An apparatus for manufacturing a pile fabric comprises a row of tying needles and an elongated suspending means extending along the row of needles. A plurality of pile yarns hang down from the suspending means to the needles preparatory to being tied and knotted by the needles to a filling yarn of a woven fabric.

---

The present invention relates to pile fabrics capable of being used for carpeting, rugs, and the like, including a method and apparatus for manufacturing such fabrics as well as to articles used in the manufacture of such fabrics.

Although there are at the present time many known methods for manufacturing pile fabrics of the above general type, they are in general unsatisfactory and complex. Because of several disadvantages, many known methods are not used in practice.

It is a primary object of the present invention to provide a pile fabric manufacturing method capable of being practiced by an unskilled person in a relatively short time, so that such a person can easily manufacture a highly satisfactory rug, carpet, or the like.

A further object of the present invention is to provide a method and apparatus which make it possible in an extremely simple manner, to tie and knot pile yarns to a woven fabric so as to form the woven fabric and the pile yarns attached thereto a highly satisfactory pile fabric.

In addition, it is an object of the present invention to provide pile yarn units in which a plurality of pile yarns are assembled in such a way as to render the method of the invention extremely convenient to carry out.

In accordance with the invention, an elongated pile yarn is placed around a tying needle, with an intermediate portion of the pile yarn passing around one side of the needle while elongated portions of the pile yarn extend from the intermediate portion thereof past the tying needle to the opposite side thereof. The woven fabric to which the pile yarn is to be tied and knotted includes an elongated yarn, such as a filling yarn which extends between, and separates, a pair of adjoining meshes, and the tying needle is passed through these adjoining meshes with the yarn of the woven fabric engaging the side of the tying needle opposite the side around which the intermediate portion of the pile yarn extends. Then, the elongated portions of the pile yarn are displaced across the yarn of the woven fabric and are connected with the tying needle at the side of the woven fabric yarn which is opposed to the side where the intermediate portion of the pile yarn is located. With these elongated portions of the pile yarn thus connected to the tying needle, the woven fabric is stripped from the needle and displaced along the portions of the pile yarn which are connected to the needle, thus pulling the intermediate portion of the pile yarn along while it extends partly around the elongated pile yarn portions which in turn are both looped completely around the woven fabric yarn and extend therefrom. By pulling tightly upon the elongated portions of the pile yarn, it is tied and knotted to the woven fabric yarn.

In accordance with the invention, the above operations are carried out on a row of tying needles whose spacing corresponds to the spacing of a row of meshes of the woven fabric yarn. Situated above and extending substantially parallel to the row of tying needles is a suspending means which includes an elongated bar and a plurality of pins projecting therefrom and from which it is possible to suspend the pile yarns so that they hang downwardly from the pins to the tying needles to cooperate therewith in the above manner.

Furthermore, in accordance with the present invention, use is made of pile yarn units each of which includes a plurality of pile yarns arranged in spaced, substantially parallel, side-by-side relation, the pile yarns of each unit being connected together by tapes which only frictionally engage the pile yarns and which are joined to each other only in spaces between the pile yarns.

The invention is illustrated by way of example in the accompanying drawing which illustrates preferred embodiments of the invention, and in which:

FIG. 1 is a fragmentary perspective illustration of the manner in which a pile yarn is tied and knotted to a filling yarn of a woven fabric, in accordance with the invention;

FIG. 2 is a partly fragmentary elevation of a pile yarn unit according to the invention;

FIG. 3 is a bottom end view of the unit of FIG. 2;

FIG. 4 is a fragmentary elevation of pile yarn units of the invention;

Figure 21:
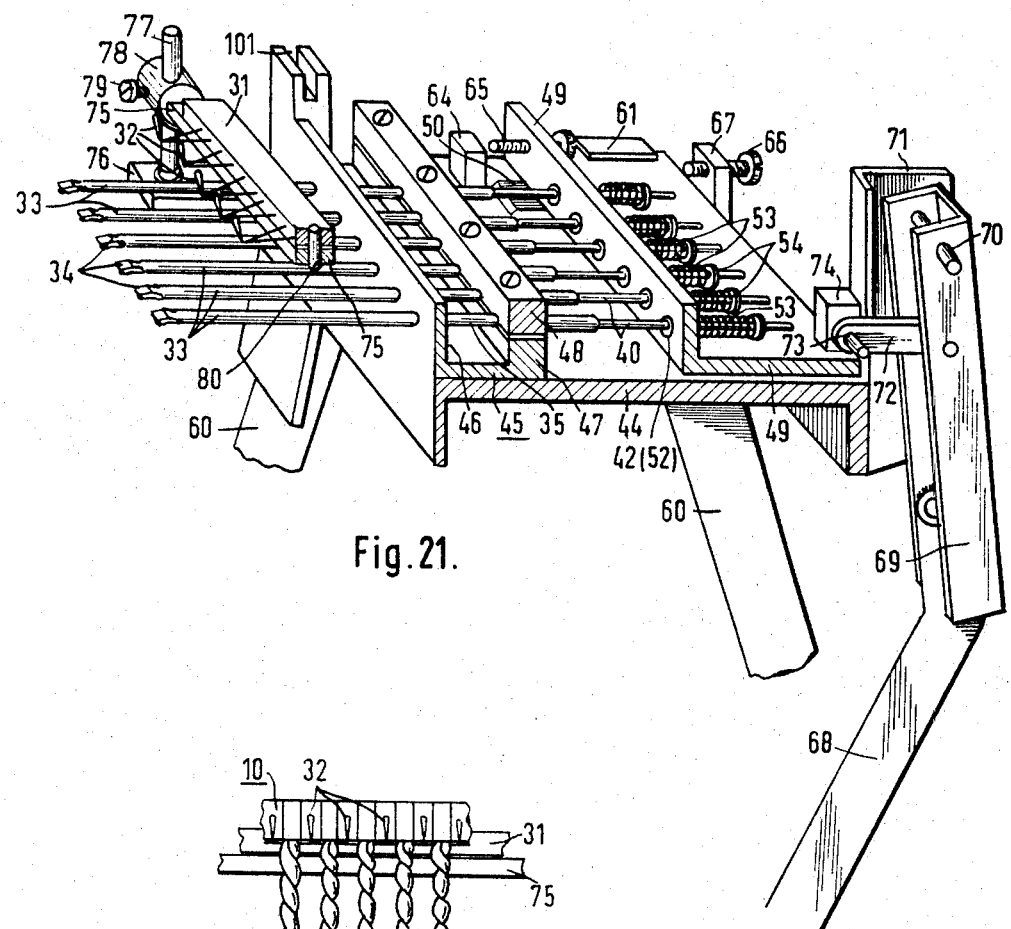
Figure 20:
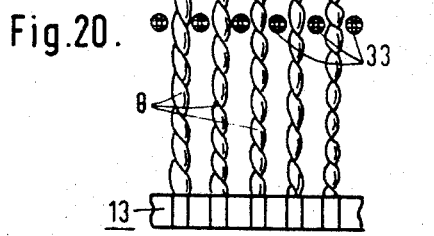
Figure 22:
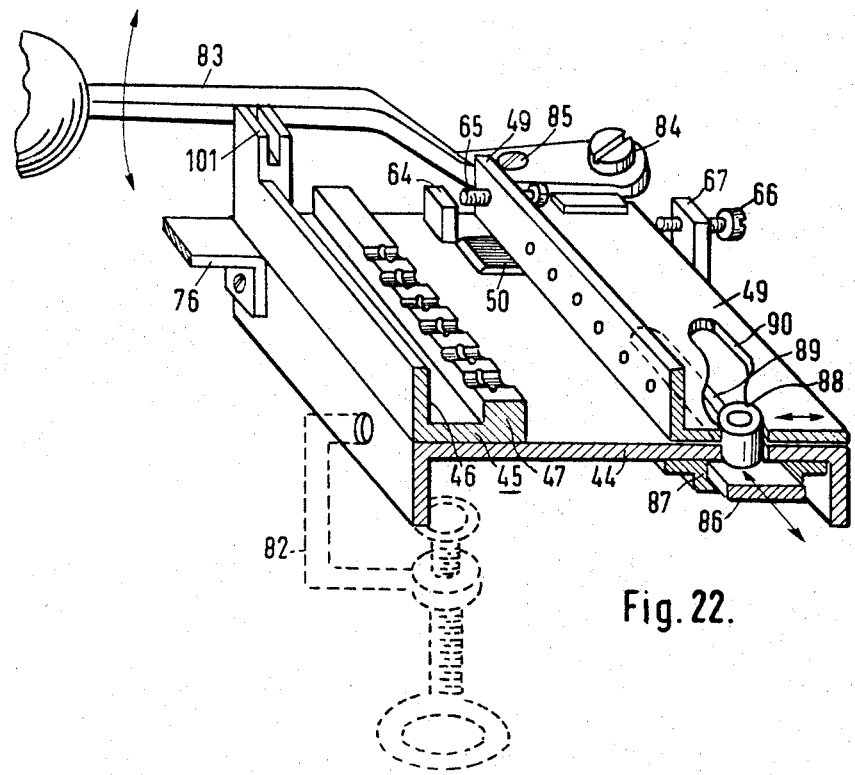
Figure 23:
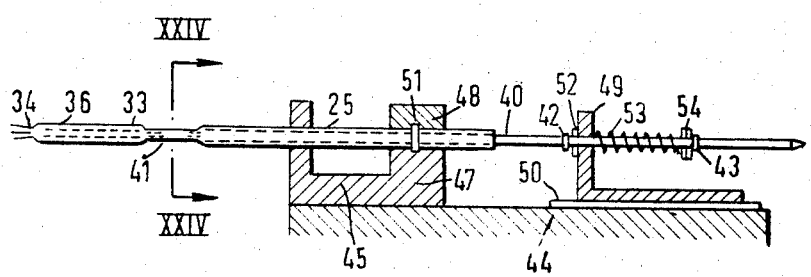
Figure 24:
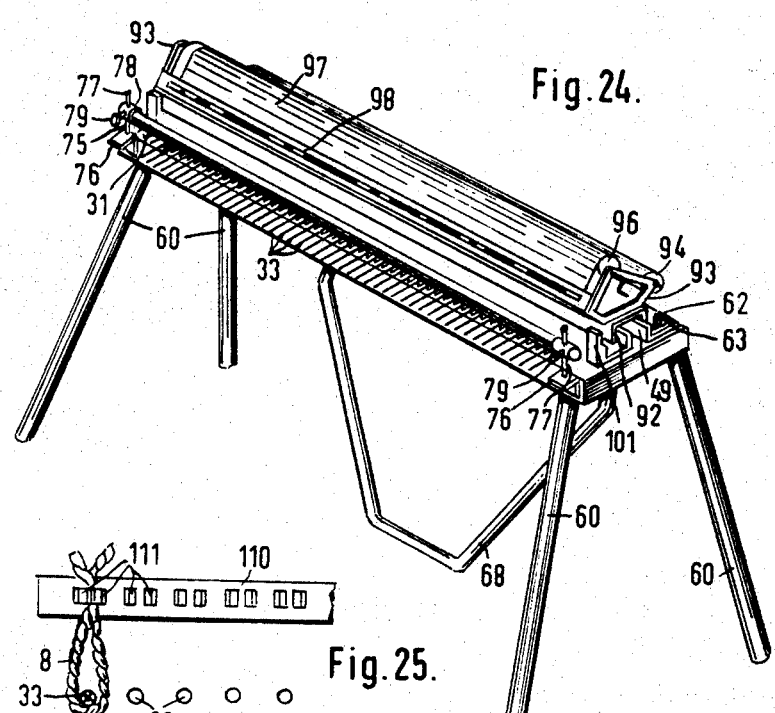
Figure 25:
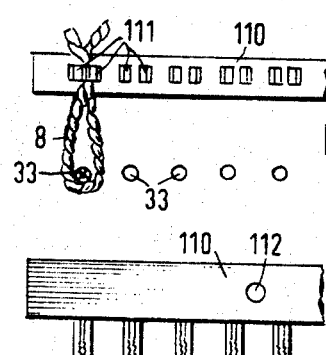
Figure 26:
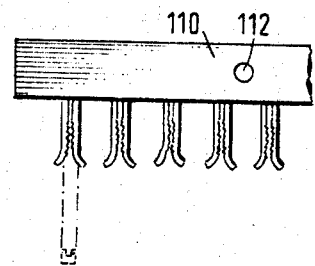

FIG. 5 fragmentarily illustrates a tape of a pile yarn unit;

FIG. 6 is another embodiment of a pile yarn unit according to the invention;

FIG. 7A is a fragmentary elevation of a further possible embodiment of a pile yarn unit of the invention;

FIG. 7B is a fragmentary elevation of yet another embodiment of a pile yarn unit according to the invention;

FIG. 8 is a fragmentary elevation of a further embodiment of a pile yarn unit according to the invention;

FIG. 9 is a fragmentary front elevation illustrating how a pile yarn unit is situated on the apparatus of the invention;

FIG. 10 is a partly sectional and schematic side view of a structure, such as that shown in FIG. 9, FIG. 10 illustrating an initial stage in the method of the invention;

FIG. 11 shows a stage in the method of the invention subsequent to that of FIG. 10, FIG. 11 also illustrating the structure of the invention in a partly sectional, schematic side view;

FIG. 12 is a partly sectional schematic side view showing a stage in the method of the invention subsequent to that of FIG. 11;

FIG. 13 shows a stage in the method of the invention subsequent to that of FIG. 12;

FIG. 14 shows a stage in the method of the invention subsequent to that of FIG. 13;

FIG. 15 shows a stage in the method of the invention subsequent to that of FIG. 14;

FIG. 16 illustrates schematically a final stage in the method of the invention;

FIG. 17 is a fragmentary perspective illustration of the gripping end of a tying needle of the invention;

FIG. 18 is a fragmentary plan view of a pair of tying needles of the invention, one of which is shown in section in FIG. 18;

FIG. 19 is a plan view showing the gripping means of a tying needle of the invention in its closed, gripping position;

FIG. 20 illustrates, in a fragmentary front elevation, partly in section, an initial stage in the method of the invention;

FIG. 21 is a partly sectional, fragmentary, perspective view of one possible embodiment of an apparatus according to the invention;

FIG. 22 is a fragmentary partly sectional perspective illustration of another embodiment of an apparatus according to the present invention, FIG. 22 showing only the supporting structure and part of the actuating structure;

FIG. 23 is a fragmentary sectional side view schematically illustrating the apparatus of the invention;

FIG. 24 is a transverse section of a tying needle of the invention taken along XXIV—XXIV of FIG. 23, in the direction of the arrows;

FIG. 25 is a fragmentary front elevation of another embodiment of a suspending means according to the invention, shown positioned with respect to the tying needles, in a schematic manner; and FIG. 26 is a fragmentary top plan view of the structure of FIG. 25.

Referring to FIG. 1, the individual pile yarns 8 are each knotted to a filling yarn 2 of a woven fabric made up of the filling or weft yarns 2 and the warp yarns 3, as indicated in FIG. 1. The pile yarns 8 which are knotted to the woven fabric, in the manner shown in FIG. 1 for one of the pile yarns, each have elongated portions 8a projecting from the woven fabric so as to form the pile of the finished fabric. FIG. 1 also illustrates the knot 8b by which the pile yarn is fixed to the fabric. This knot 8b is situated at an intermediate portion of the pile yarn, which is in a single length having the elongated portions 8a extending from the knot to form part of the pile.

Pile yarn units

Referring now to FIGS. 2–8, in accordance with one of the features of the present invention, a plurality of the pile yarns 8 are grouped together to form pile yarn units which may have any of the structures illustrated in FIGS. 2–8, for example. The individual pile yarns of each unit are held together by a tape means which includes at least a pair of elongated web portions. The pair of elongated web portions of the tape means of the invention only engage the yarns frictionally. The pair of web portions of the tape means are substantially coextensive with each other and are joined to each other only in spaces between the successive yarns, as by being glued, welded or otherwise fastened to each other, for example.

Thus, referring to FIGS. 2 and 3, it will be seen that the tape means of this embodiment includes the upper tape assembly 10 of FIG. 2, this assembly 10 including the front tape 11 and the rear tape 12. The tape means of this embodiment also includes the lower tape assembly 13 made up of a front tape 14 and a rear tape 15, as viewed in FIG. 2. The latter tapes 14 ad 15 are also illustrated in FIG. 3.

The tape assemblies 10 and 14 frictionally engage the free ends of the yarns 8. The pair of tapes 11 and 12 of the assembly 10 are glued or welded to each other only at the areas 10a situated between the yarns 8, while the pair of tapes 14 and 15 of the tape assembly 13 are joined to each other, as by welding or glueing, only in the spaces 13a situated between the yarns 8. Although each pair of tapes of a tape assembly are joined to each other only in the spaces between the yarns, nevertheless the areas at which the tapes are joined to each other approach so closely to the yarns themselves that the tapes have a tight frictional grip on the yarns while at the same time only engaging the latter frictionally. Thus, as may be seen from FIG. 3, at least one of the tapes, tape 14 in this example, will conform to the configuration of the yarns 8. In this way there are no deposits of any cement or other adhesive material on the yarns themselves.

A unit as shown in FIGS. 2 and 3 can be separately manufactured in the form of an elongated supply strip of relatively great length from which sections of required length can be separated.

Moreover, it will as a rule be advisable to form units as shown in FIGS. 2 and 3 initially from yarns of relatively long length which are advanced either continuously or in a stepwise manner, and which are situated at the required distance from each other, in side-by-side relation. Predetermined lengths of the yarns 8, such as lengths ranging from 7 to 13 cm., are then provided with the tape means of the invention in a form somewhat different from that shown in FIGS. 2 and 3.

Thus, as shown in FIG. 4, the individual lengths of yarns 8 which come from any suitable source have pairs of tapes joined thereto, in the manner shown in FIG. 4, at distances from each other which will correspond to the required lengths of the yarns of a unit, as shown in FIGS. 2 and 3. The tapes which are joined to the yarns at this time have a width which is double the width of the tapes shown in FIG. 2. In this way there is provided a structure, as fragmentarily illustrated in FIG. 4, where elongated continuous lengths of yarns 8 have pairs of tapes joined thereto at predetermined intervals corresponding to the required lengths of the yarns of any one unit. The pairs of joined tapes of FIG. 4 are then cut at an intermediate line, such as the dotted lines shown in FIG. 4, situated midway between the opposed side edges of the tapes themselves, and this cutting extends through the yarns 8 themselves, so that in this way it is possible to derive, from a supply as shown in FIG. 4, units as indicated in FIGS. 2 and 3. Thus, the tapes of FIG. 4 which are double the widths of the tapes of FIG. 2, after being cut midway between their side edges will form the tapes of FIG. 2 with individual lengths of yarns 8 extending between pairs of successive tapes to provide a pile yarn unit as shown in FIG. 2. It is possible to cut through the structure along the dotted lines to provide an upper unit made up of the tape portions 11a, 12a, 14a, and 15a, while the second unit will be made up of the tape portions 11b, 12b, 14b, and 15b, and a third unit will include the series of yarn lengths 8 extending between the tape portions 11c, 12c, 14c, and 15c, and so on.

Pile yarn units of the type described above can be altered in many different ways in accordance with the invention. Thus, the individual tapes 10 and 13 of FIGS. 2 and 3 can be composed of single tapes such as the tape 16 shown in FIG. 5. In this case, a single tape 16 which is double the width of the tapes 11 and 12, for example, is folded along a fold line situated midway between the opposed side edges of the tape so as to provide in this way a pair of coextensive web portions respectively corresponding to the tapes 11 and 12, and the ends of the yarns 8 are received between these web portions which are then welded or glued to each other in the manner described above. In this way it is possible to provide a tape means where the ends of the yarns are joined to a single tape, suitably folded as shown in FIG. 5.

As will be apparent from the description which follows, a pile yarn unit of the invention is suspended from a suitable suspending means which enables the individual pile yarns to cooperate with additional structure of the invention so as to practice the method of the invention for tying and knotting the pile yarns to the woven fabric. The suspending means can include an elongated bar having hooks or other means, such as suitable pins, extending therefrom, as described below. In order to provide cooperation between the pile yarn units and the suspending means, the individual tapes may be formed with a row of openings, such as the openings 10d and 13d shown in FIG. 6 situated in the spaces substantially midway between the successive pile yarns 8. With a pile yarn unit of this type, where the suspending means includes a row of elongated pins whose spacing corresponds to the spacing between the row of openings 10d and 13d, the pins may be received in these openings for a purpose described below. Of course, the diameter of the pins which extend through these tape openings should correspond to the size of these openings.

Moreover, it becomes possible with this construction to suspend from such a suspending means a unit which includes only a single pile yarn. In this case, the tape means will also frictionally engage the ends of the yarn but will project therefrom through approximately one half the distance normally provided between a pair of successive pile yarns, with the ends of such a tape having notches corresponding to one half of the openings 10d or 13d. The pins can be received in these notches for supporting a single yarn in this way.

In some cases where more complex patterns are required or for other reasons, it may be necessary to situate, at a single location, one single pile yarn of a given color, and thus in order to take care of a situation of this type it is possible to provide a pile yarn unit which has but a single yarn.

In the case where only individual pile yarns of a given color, for example, are to be situated by themselves at relatively great distances from each other in the pattern, units as shown in FIGS. 7A and 7B may be used. In this case, the pile yarns are joined in the same way to the tape means, but the spaces between the yarns are considerably greater. The dotted lines of FIGS. 7A and 7B indicate the normal spacing of the pile yarns from each other. In FIG. 7A every other pile yarn is omitted from an arrangement as shown in FIG. 2, for example, so that the spacing between the yarns of FIG. 7A is double that of FIG. 2. If the successive pile yarns of a normal unit are designated I, II, III, IV, V, etc., then in the unit of FIG. 7A the second, fourth, sixth, eighth, etc. yarns have been omitted. With an arrangement as shown in FIG. 7B, after each pile yarn which is present in the unit of FIG. 7B, a pair of pile yarns of a normal distribution as shown in FIG. 2, for example, are omitted, so that with respect to enumerating the pile yarns as set forth above, yarns II and III, then yarns V and VI, and then yarns VIII and IX, and so on, have been omitted in the unit of FIG. 7B. Any desired variations of this type may be provided. Thus, with reference to a normal distribution as shown in FIGS. 2 and 6, for example, it is possible to omit three or more successive yarns, permit the next yarn to remain and then again to omit three or more yarns, and so on. Thus, a limitless variety may be provided for the pile yarn units of the invention, according to the final pattern which is desired in the pile yarn fabric manufactured according to the invention.

Moreover, it is possible to provide pile yarn units in which, while the several yarns are situated at the normal distance from each other, these yarns have different colors arranged in a predetermined sequence which repeats itself, so that, for example, black, yellow and white yarns can follow each other in a given sequence along the unit. Moreover, an arrangement as shown in FIGS. 7A and 7B can be used with advantage for blending into the final pile fabric selected colors from a supply of pile yarn units each of which is composed of only a single color for the yarns thereof, with these different units combined together in any desired manner.

It is also possible to provide pile yarn units in accordance with the invention wherein the yarns are in the form of hair-needle type loops, as indicated in FIG. 8. In this case all of the ends of the yarns are situated in a single row and can be situated between separate tapes of a tape means, or between web portions of a single tape of the type shown in FIG. 5. In this case also the portions of the tapes situated in the spaces between the ends of the yarns are joined to each other in the manner described above. In the particular examples shown in FIG. 8, the ends of all of the yarns are only frictionally held between tapes 17 and 18 which are welded or glued together at the areas 17a.

*Method of tying and knotting*

The manufacture of a pile fabric according to the invention takes place in the following manner:

Referring to FIGS. 9, 10 and 20, a pile yarn unit as described above is placed on a suspending means of the invention formed by an elongated bar 31 having a plurality of pins, hooks, or the like 32, fixed to and projecting therefrom in the manner shown in FIGS. 9 and 10, for example. Thus, in the illustrated embodiment, the bar 31 fixedly carries substantially hook-shaped pins 32 which are distributed in a row in accordance with the distribution of the meshes of the woven fabric. This distribution corresponds also to the distribution of the yarns of a pile yarn unit. The tying and knotting apparatus includes below the suspending means 31, 32, a substantially parallel row of tying needles 33, indicated in FIGS. 9, 10 and 20, and shown in detail in FIGS. 17–19, 21, 23, and 24. The row of tying needles 33 also has the several needles thereof spaced from each other according to the spacing of a row of meshes of the woven fabric, as well as according to the spacing of the hook pins 32 and the distribution of the pile yarns. However, it is to be noted that, while the pins 32 are situated directly over the needles 33, respectively, when a pile yarn unit of the invention is suspended from these pins 32 so that the yarns 8 hang down, these yarns 8 become situated beside the needles 33 in the spaces therebetween, as indicated most clearly in FIG. 20. Thus, the several pins 32 are respectively aligned with the needles 33, and the elevation of the needles 33 with respect to the needles 32 is such that the needles 33 become situated somewhat above the centers of the hanging yarns 8. This relationship is also indicated in FIG. 20.

Although straight pins can be received in openings, such as openings 11d of FIG. 6, when hook-shaped pins 32 are used, they are received between the pile yarns and beneath the upper tape assembly which simply rests at its lower edge on the pins 32.

With a pile yarn unit of the invention thus suspended from the suspending means 31, 32, the lower tape assembly 13 is grasped by the operator and initially, as viewed in FIG. 20, advanced to the left. Then the tape assembly 13 is raised upwardly and placed on the pins 32, respectively, of the suspending means, and in this way an arrangement as shown in FIG. 9 is achieved. It will be noted that now, as also illustrated in FIG. 10, each pile yarn 8 extends around a needle 33 with an intermediate portion of each pile yarn extending around one side of the needle 33 and with elongated portions of the pile yarn extending from its intermediate portion past the needle 33 to the opposite side thereof. Thus, in the particular example illustrated in FIGS. 9 and 10, each pile yarn 8 has its intermediate portion passing around the lower side of a tying needle 33, and its elongated portions extend from its intermediate portion upwardly past the needle 33 to the upper side thereof.

With the pluarlity of pile yarns having thus been positioned with respect to the plurality of tying needles 33, the woven fabric 1 is placed on the needles 33. The filling yarn 2, to which the several pile yarns are to be tied, extends between and separates two rows of adjoining meshes of the fabric from each other, and the needles 33 are inserted through the adjoining pairs of meshes. At the beginning of the tying of the pile yarns to the woven fabric, the lowest row of meshes have the needles inserted therethrough, and then after the pile yarns have been tied to the upper filling yarn of this lower row of meshes, the second row of meshes is placed with the needles 33 respectively passing therethrough, and pile yarns are tied to the second filling yarn, and so on. In FIGS. 10 and 16 it is assumed that the lower filling yarns of the fabric have already had the pile yarns tied thereto, and that the method is now going forward with the next filling yarn. For example, it can be assumed that the lower six filling yarns have already had pile yarns tied thereto and that the method is now going forward with the seventh filling yarn from the bottom.

This seventh filling yarn will rest directly on top of the tying needles 33, with the latter passing through the row of meshes situated just beneath this seventh filling yarn. The part of the woven fabric to which pile yarns have not yet been tied, and which extends above the filling yarn to which the pile yarns are now to be tied, is turned downwardly, in the direction of the arrow shown in the upper left of FIG. 10, with the filling yarn which rests on the needle 33 acting as a turning axis, and the next row of meshes, which are respectively in alignment with the meshes through which the needles 33 extend, are displaced along the needles 33 so that the latter also extend through this next row of meshes. Thus, the fabric 1 will hang in the manner shown in FIG. 11, where the filling yarn to which the pile yarns are to be tied forms the uppermost edge of the doubled fabric which hangs down from this uppermost edge with the filling yarn which forms the uppermost edge resting directly on the needles 33 and with the latter passing through the adjoining rows of meshes which are separated by the upper filling yarn. With the woven fabric thus placed on the tying needles 33, the woven fabric is displaced, in the direction of the arrow shown just above the needle 33 in FIG. 10, closer to the pile yarns 8, so that the parts will have the position indicated in FIG. 11.

In a manner which is described in greater detail below, the suspending means 31, 32 is capable of being displaced from its support 75, indicated schematically in FIGS. 10–12, and at this time this suspending means is displaced from its support 75 manually by the operator, so that it is moved from the position of FIG. 11 to the position of FIG. 12, bringing the elongated portions of the several pile yarns 8 across the uppermost filling yarn to the side of the latter opposed to that side thereof where the intermediate portions of the pile yarns 8 are situated. In this way, the parts will assume the position shown in FIG. 12.

The several needles 33 include, at their front ends, gripping means 34 displaceable between open yarn-receiving, non-gripping positions and closed, yarn-gripping positions, in a manner described in detail below. With the several gripping means 34 in their open, non-gripping positions, the ends of the pile yarns 8 adjacent the tapes 10 and 13 are placed into the gripping means 34 at the several needles 33, so that at each needle 33 the ends of a pair of elongated portions of a single pile yarn are held in the gripping means 34, in the manner indicated in FIG. 12. After the ends of the several pile yarns have thus been situated in the several gripping means 34, respectively, these several gripping means are closed, in a manner described below, so as to grip the ends of the pile yarns, and the spacing of the gripping elements of each gripping means is such that the ends of a pile yarn can easily be introduced between the pair of gripping elements, while at the same time in the closed position of the gripping means the ends of a pile yarn are tightly gripped.

With the parts thus located in the position indicated in FIG. 12, the suspending means is manually removed simply by displacing it to the left, as viewed in FIG. 12, and now the suspending means is returned to its initial position on the support 75.

The parts will now have the condition indicated in FIG. 13. At this time the fabric 1 is stripped from the tying needles 33. As a result of the movement of the woven fabric 1 from the needles 33, the uppermost filling yarn, to which the several pile yarns are to be tied and knotted, engages and slides along the pile yarns so as to pull the pile yarns themselves from the needles 33. The filling yarn moves along the elongated portions of the pile yarns which are connected to the needles 33, and the filling yarn advances the intermediate portions of the pile yarns along the elongated portions thereof, these intermediate portions thus becoming situated in a position extending part of the way around the elongated portions of the pile yarns which are still connected to the needles 33. In this way, the position of the parts shown in FIG. 15 is achieved.

Thus, the filling yarn to which the pile yarns are to be tied necessarily pulls up behind itself the intermediate portions of the pile yarns which initially extend around the undersides of the needles 33. These intermediate portions of the pile yarns are thus pulled along the elongated pile yarn portions from the position of FIG. 14 through the position of FIG. 15 into the position of FIG 16.

The stripping of the woven fabric from the needles 33 will cause the tapes 10 and 13 to be frictionally displaced from the ends of the pile yarns. They simply fall, as indicated in FIG. 14, and can be collected as scrap.

Once the parts have reached the position shown in FIG. 15, the woven fabric 1 is pulled downwardly toward the left, as viewed in FIG. 16, or horizontally to the left if preferred, so that the several pile yarns are tightly knotted onto the filling yarn. The tightness of the knots is determined by the force with which the free ends of the pile yarns are still gripped by the plurality of gripping means 34 of the several needles 33. Once the several pile yarns have been tied onto the filling yarn with knots which are sufficiently tight, the woven fabric is displaced further, after the plurality of gripping means have been partly or fully opened, so as to displace the pile yarns from the apparatus. The parts will now have the position of FIG. 16.

It is to be noted that, with this method, each pile yarn has its intermediate portion partly surrounding the elongated portions of the pile yarn, which extend from the intermediate portion, with these elongated portions being completely looped around the filling yarn and extending therefrom to form the pile portions of the fabric itself.

Of course, the method of the invention is not limited to single tying needles but is practiced with a complete row of needles 33 and simultaneously on all of the pile yarns of a given pile yarn unit. For example, where a row of 99 tying needles 33 is provided and, with a corresponding width of woven fabric, all of these needles are to be used, then it is possible with the invention to tie 99 pile yarns simultaneously to a single filling yarn of the woven fabric. The method of the invention has been carried out at each needle in the manner indicated in FIGS. 10–16 for a single needle and pile yarn. Inasmuch as the structure is arranged as shown in FIGS. 9 and 20, it is apparent that all of these operations will take place simultaneously at each tying needle. A comparison of FIGS. 15 and 16 with FIG. 1 will show that the knots produced with the method and apparatus of the invention will correspond to the structure indicated in FIG. 1.

In the event that a pile yarn as shown in FIG. 8 is used, then it is unnecessary to carry out the step transforming the parts from the position shown in FIG. 20 into the position of FIG. 9, since the parts will initially have a position as shown in FIG. 9. Thus, with a unit as shown in FIG. 8 it is unnecessary to pass the pile yarns around the tying needles. In a single step, it is possible to place the unit of FIG. 8 in a position where the needles extend through the loops formed by the yarns, and in this case the tape of FIG. 8 will rest on the pins 32. The simple placing of the tape on the pins 32, while the needles 33 pass through the loops of the pile yarns, is sufficient initially to start off the method in the position indicated in FIG. 9. Then the method is carried out in the manner described above.

Tying needles

All of the tying needles have the same construction. FIG. 21 shows how the several needles 33 are mounted on the apparatus. Each needle 33 includes an elongated outer tubular casing 35 having opposed open ends, and at the front end of each casing 35, where the gripping means 34 is situated, the casing 35 has a funnel-shaped or tapered configuration of rectangular cross section (FIG. 17). This open front end 36 of each casing 35 is bridged by a substantially U-shaped member 37 which may be formed integrally with the casing 35. The U-shaped member 37 divides the open end 36 of each casing 35 into a pair of openings through which hooks 38 and 39 of the gripping means 34 respectively extend. These hooks 38 and 39 are directed toward each other and together form a tong-like double-hook gripping means 35.

As is apparent from FIGS. 21 and 23, a plurality of plungers 40 respectively extend into the several casings 35 through the open rear ends thereof, and these plungers 40 also form part of the needles 33 and they are respectively longitudinally shiftable with respect to the casings 35. However, the plungers 40 cannot turn with respect to the casings 35. For this purpose, a means such as that shown in FIG. 24 is provided. For example, the casings 35 may have guiding zones 41 (FIG. 23) which are flattened and which cooperate with opposed flattened outer surfaces of the hollow plungers 40, in the manner shown in FIG. 24, so that while the plungers 40 are longitudinally shiftable in the casings 35, they cannot turn therein. The flattened zone 41 of each casing 35 is indicated most clearly in FIG. 23 where this flattened zone is shown situated somewhat behind the front end of the casing 35. As indicated in FIGS. 21 and 23, each plunger 40 fixedly carries a collar 42 and to the rear of the latter a second collar 43. These collars may, for example, take the form of suitable rings which are soldered or otherwise fixed to the plungers.

The springy hooks 38 and 39 of each gripping means 34, in the illustrated example, take the form of springy wires of circular cross section, these wires being folded upon themselves so that each springy hook 38 and 39 has a pair of elongated wire portions situated in side-by-side relation. In the case of the narrower springly hook 38, the elongated wire portions are situated directly next to each other, as shown most clearly in FIG. 17, these elongated wire portions of the hook 38 directly engaging each other at least in the region of the outer hook end thereof. On the other hand, the wider hook 39 has the elongated wire portions thereof spaced from each other, at least in the region of the outer hook end thereof, so that a wider hook is formed with the wire at the free end of the hook having a horse-shoe-shaped configuration with a given spacing between the elongated wire portions. It is only at a certain distance from the free end of the hook 39 that the wire portions thereof are situated closer to each other, for example directly next to each other, at the region of the plunger 40.

The front ends of the plungers 40 are open, and the wires, which at their own front ends form the hooks 38 and 39, extend completely through the hollow tubular plungers with the rear free ends of the wires which form the hooks 38 and 39 extending somewhat beyond the rear free ends of the tubular plungers 40. These ends of the wires may be seen at the right end of FIG. 23 projecting slightly beyond the right end of the plunger 40. At its rear end, shown at the right in FIG. 23, each plunger 40 is compressed to have a tapered, funnel-shaped configuration with the rear end of each plunger 40 tightly clamping the rear ends of the hook wires. In addition, these wires can be soldered or welded to the rear ends of the plungers 40, so that they are securely fixed thereto. The curvature of the hooks 38 and 39 is such that, in their unstressed condition, these springy hooks tend to assume a position where they are open and spaced from each other, as shown in FIG. 17, so that, in the unstressed condition of the gripping means 34, the hooks 38 and 39 thereof assume an open, yarn-receiving, non-gripping position.

The individual hooks may also be formed more simply from leaf springs but it is particularly simple to situate hooks from wire of circular cross section along the interior of the tubular plungers 40. The casing 35 of each tying needle 33 may be made of a single tube or from a plurality of sections. In order to assemble each tying needle, particularly when the casing 35 is in one piece, the pair of hooks 38 and 39, which have been completed, are inserted through the open end 36, respectively on opposite sides of the member 37, and these hooks are also inserted into the plunger 40, being threaded therethrough with the plunger 40 inserted into the casing 35 by such a distance that the free ends of the wires extend rearwardly beyond the plunger. Then these rear ends are fixed to the plunger at the rear end of the latter in the manner described above.

*Needle supporting and actuating structure*

In order to support the tying needles 33 the apparatus includes a support means made up of a suitable bed plate 44 which has a normally horizontal upper surface. On the bed 44 is situated an elongated rail 45 (FIGS. 21–23) of U-shaped cross section having a front upwardly directed wall 46 and a rear upwardly directed wall 47, this rail being fixed to the bed 44. The rear wall 47 has fixed thereto an upper bar 48 which, together with the rail wall 47, defines openings through which the casings 35 extend in the manner apparent from FIGS. 21–23. An actuating means for actuating the needles includes an elongated rail 49 of angular cross section which extends parallel to the rail 45, and the bed 44 carries slide blocks 50 on which the actuating means 49 is slidable forwardly and rearwardly. The upper bar 48 which is carried by the rear wall 47 of the rail 45 is releasably fixed to the latter by suitable screws, and upon removal of these screws it is possible to remove the bar 48, so that the bar 47 will then have the condition shown in FIG. 22. The front wall 46 of the rail 45 is formed with openings for respectively receiving the casings 35 which extend through these openings. In addition, the bar 48 together with the rear wall 47 of the rail 45 are formed with aligned grooves which together form openings aligned with the openings of the wall 46. The casings 35 also extend through these latter openings defined by the bar 48 and the rear rail wall 47.

With the bar 48 removed, the casings 35 are inserted through the openings of the wall 46 and then rest on the upper grooves of the rear wall 47, these upper grooves being visible in FIG. 22. The interface between the upper surface of the wall 47 and the lower surface of the bar 48 is situated in a plane midway between the openings which these elements define to receive the casings 35. As is apparent from FIGS. 22 and 23, both the wall 47 and the bar 48 are formed in their grooves with arcuate indentations for receiving collars 51 which are respectively fixed to the casings 35, one of the collars 51 being visible in FIG. 23. Thus, these collars 51 which are fixed to the casings 35 and which are received in corresponding groove portions of elements 47 and 48 prevent longitudinal movement of the casings 35 when the bar 48 is reassembled with the wall 47. Furthermore, the diameters of the openings formed by the elements 47 and 48 are selected so that, when the bar 48 is reassembled with the wall 47, the casings 35 are tightly gripped and cannot turn. In order to be able to introduce the casings 35 together with the collars 51 into the elongated grooves of wall 47, these casings 35 must be tilted to a small extent. For this reason, the openings of the front wall 46 of the rail 45 are made somewhat larger than the outer diameter of the casings 35. In this way, it is also possible to pass the flattened zones 41 of the casings 35 through the openings of the front wall 46 of the rail 45. However, it is also possible to make the front wall 46, in the same way as the rear wall 47 and the bar 48 thereover, of a pair of elongated members which coact in the same way as the wall 47 and the bar 48, so that with such a construction it is possible to grip the casings 35 also in the openings of the front wall 46.

Simultaneously with the mounting of the casings 35 on the rail 45 in the manner described above, the plungers 40 are introduced through the guide openings of the upwardly directed front wall of the actuating rail 49. The angle bar which forms the actuating rail 49 can also be mounted on the apparatus after the casings 35 are assembled with the rail 45. The diameters of the openings in the front wall of the actuating rail 49 are large enough so that the collars 42 and 43 can slide through these openings. Also, these collars can pass through the openings in the wall 46 of the rail 45 as well as the openings defined between the rear wall 47 and the bar 48 thereover.

With the parts thus assembled, a plurality of split bendable washers 52 are spread apart and passed around the several plungers 40 between the front collars 42 and the front surface of the rail 49, so as to prevent rearward movement of the plungers 40 with respect to rail 49 beyond the position shown most clearly in FIG. 23. Then a plurality of coil springs 53 are placed on the several plungers 40 engaging the rear surface of the upwardly directed wall of the rail 49. These springs 53 are compressed and a plurality of additional split washers 54 are placed around the plungers 40 and are clamped together so as to be situated between the rear collars 43 and the rear ends of the springs 53, the clamping together of the washers 52 and 54 preventing them from moving past the collars 42 and 43, respectively. Therefore, in the position of the parts shown in FIG. 23, the springs 53 urge the plungers 40 rearwardly to the illustrated position where the collars 42 engage the washers 52 which in turn engage the front face of the rail 49.

When the parts are in the position shown in FIGS. 21 and 23, the springs 53 hold, in the illustrated position of the rail 49, the plurality of gripping means 34 in their closed, gripping positions in a yieldable manner. When the rail 49 is displaced forwardly from the position thereof shown in FIGS. 21 and 23, to the left as viewed therein, the plungers 40 are displaced forwardly in the casings 35 and the individual hooks of the several gripping means 34 spread apart from each other so that these gripping means assume their open, non-gripping, yarn-receiving positions. One of the gripping means 34 is shown in this position in FIG. 17. Upon retraction of the plungers 40, the inclined rear parts of the hooks 38 and 39 are cammed inwardly toward each other by the open front end 36 of each casing 35. During continued rearward movement of each plunger 40 to the right, as viewed in FIGS. 21 and 23, the hooks of each gripping means approach each other and assume a closed yarn-gripping position. At the end of this movement, as shown in FIGS. 21 and 23, the pair of hooks of each gripping means have the position indicated in FIG. 19.

*Yarn gripping means*

Each gripping means 34 must, on the one hand, in order to provide convenient operation of the apparatus, particularly during introduction of the ends of the pile yarns into the gripping means, have a sufficiently large opening or spacing between the hook members 38 and 39, so that no difficulty will be encountered in introducing the ends of the pile yarns into the open gripping means. On the other hand, it is necessary to arrange the several tying needles 33 beside each other at the same distribution as that of the succeessive meshes of the woven fabric 1, and thus at the same distribution as the several pile yarns 8 of each pile yarn unit. This distribution results from the requirement that pile yarns of conventional thickness be situated next to each other with a sufficient density in the pile, so that the rug or other pile fabric will be reliably provided with a good appearance and will wear well. Thus, the distribution of the several needles 33 will require them to be situated relatively close to each other, and at the same time the hooks of the gripping means shown in FIGS. 17–19 are constructed in such a way that they can overlap each other.

As shown in FIG. 18, the opening 39a formed between the wire portions of a hook 39 of one gripping means is adapted to receive the narrower hook 38 of the adjoining means 34, so that in this way it is possible for the plurality of gripping means to have relatively wide open positions while at the same time the several needles 33 can be situated quite close to each other. Thus, the longer but narrower hooks 38 of one tying needle 33 can be received in the gap 39a of the shorter but wider hook 39 of the adjoining needle 33. By making these hooks from wires of circular cross section it is possible easily to provide the construction shown in FIG. 17 which enables the pair of hooks of each gripping means to open fully while adjoining pairs of gripping means can overlap in the manner shown in FIG. 18.

Instead of providing an arrangement where a hook of one gripping means is received in a gap of a hook of an adjoining gripping means, it is also possible to situate the pair of hooks of each gripping means in a plane which is inclined, to a relatively small extent, with respect to the plane of the row of needles 33, which is a horizontal plane, so that the pair of hooks of each gripping means are now tilted from the horizontal position. In this case, it is also possible for the several gripping means 34, which will be situated in parallel planes which are inclined with respect to the bed 44 to have an overlapping relation where the hook of one gripping means extends over the hook of an adjoining gripping means. In such a case, the hooks of the adjoining gripping means will move past each other during movement of the gripping means between their open and closed positions, without any engagement or any interference between the adjoining gripping means of the several needles. With such a construction it is unnecessary to provide the hook 39 of each gripping means 34 with a gap 39a. Therefore, with such an arrangement it is possible to provide hooks 38 and 39 from individual leaf springs which are not formed with any openings, so that the manufacture of the hooks is simplified.

*Supporting frame*

As is fragmentarily illustrated in FIG. 21, the entire apparatus may include a suitable stand having legs 60 two of which are indicated in FIG. 21, these legs being threaded at their top ends into suitable internally threaded sleeves which are fixedly carried by the bed 44, so that in this way the latter forms a tabletop type of support carried by the legs 60 which can diverge outwardly from each other, for example. Of course, the bed 44 itself can be formed with threaded openings to receive the top threaded ends of the legs 60, and there may be four legs 60 situated in the regions of the corners of the bed 44. FIG. 21 shows only the upper portions of the pair of legs which are situated at the left side of the apparatus, as viewed from the front thereof.

The rail 45 can be releasably fixed to the bed 44 by suitable screws. The tying needles 33 are held by the rail 45 in the manner described above, and the plungers 40 are operatively connected with the actuating means 49 through the compressed springs 53 which serve as a transmission means for transmitting rearward movement of the actuating means 49 to the plungers 40. Forward movement of the plungers 40 is transmitted from the actuating means 49 directly to the plungers 40 through the washers 52 and the collars 42. The actuating means 49 slides on blocks 50, as pointed out above, and in addition it is guided for forward and rearward movement by a suitable guiding structure which may include at one end of the bed 44 an angle member 61 shown at the upper right portion of FIG. 21 extending over and slidably engaging the top surface of the rear, horizontal wall portions of the angle iron 49. At the right end of the structure, which is not illustrated, this horizontal wall of the actuating means 49 may be formed with an elongated slot extending forwardly and rearwardly. A suitable bolt may extend through this slot into a threaded opening of the bed 44, so as to form a guide pin extending through the slot of the horizontal wall of member 49 to guide the latter for forward and rearward movement. Such a slot and guide pin will maintain the left edge of the angle iron 49 in slidable engagement with the vertical wall of the angle iron 61 which extends from the upper wall thereof down to and is fixed to the bed 44, so that the upper wall of the angle iron 61 together with the upper surface of the bed 44 define a gap which receives the left edge of the angle iron 49 which engages the vertical wall of angle iron 61 to be guided by the latter in cooperation with the pin-and-slot type of guide at the other end of the angle iron 49. Such a guide pin, which extends through a slot, may have a head end wider than the slot and engaging the top surface of the horizontal wall of the angle iron 49 so as to guide the latter at its top surface in the same way as the angle iron 61.

The extent to which the actuating means 49 can move forwardly and rearwardly is limited. At one end of its movement, the actuating means 49 is limited by a block 64 fixedly carried by the bed 44 forwardly of the angle iron 49, and the upwardly directed front wall of the angle iron 49 carries an adjusting bolt 65 whose front end will engage the limiting block 64 so that forward movement of the actuating means 49 can be limited. This structure which limits the forward stroke of the actuating means 49 is also illustrated in FIG. 22.

The rearward movement of the actuating means 49 is limited by an adjusting screw 66 threaded through an arm 64 which is fixedly carried by the bed 44, as shown most clearly in FIGS. 21 and 22, so that the front end of the screw 66 forms a rear limiting means limiting the rearward movement of the actuating means 49. This screw 66 engages at its front end the rear edge of the horizontal wall of the angle iron 49.

Thus, by adjusting the screws 65 and 66 it is possible to adjust the size of the stroke of the actuating means 49. Moreover, the location of the end positions thereof can also be determined in this way. In this way it is possible to achieve a very good operation for the tying needles 33. When the rail 49 is in the rear position thereof shown in FIG. 21, determined by the screw 66, the plurality of gripping means 34 are in their closed positions. When the rail 49 is in its forward position, determined by the screw 65, the plurality of gripping means are in their open, yarn-receiving position. When the rail 49 is displaced rearwardly, the plungers 40 will tend to remain in their forward positions although they are urged rearwardly by the springs 53 which seek to transmit the rearward movement of the rail 49 to the plungers in the above-described manner. However, pile yarns which are gripped in the several gripping means will resist the rearward movement of the plungers (see FIG. 13, for example), and the presence of pile yarns in the several gripping means will prevent them from assuming their fully closed position. This fact will present no difficulty with respect to the rearward displacement of the actuating means 49 since the several springs 53 can become compressed further so as to yield while the rail 49 moves rearwardly with respect to the plungers 40.

*Drive means*

Any suitable drive means may be provided for displacing the rail 49. In the example illustrated in FIG. 21, this drive means takes the form of a foot lever 68 which is fragmentarily illustrated and which may have a substantially U-shaped configuration with upwardly directed legs which diverge from each other and which, at their upper ends, extend straight and are parallel to each other. These legs of the foot lever 68, the bottom end of which is accessible to the foot of the operator, will extend substantially vertically in the normal position of the apparatus and are respectively received in and fixed, as by welding, for example, to a pair of channels 69. These channels which are of U-shaped cross section are respectively pivotally supported by pins 70, and one of these assemblies is visible in FIG. 21.

Thus, FIG. 21 shows the left assembly which is connected to the top end of the foot lever 68. The pair of pivot pins 70, which have a common axis, are respectively carried by supporting arms 71 in the form of rigid angle irons which are fixed to the rear wall of the bed 44 and extend upwardly beyond the top surface thereof in the manner shown most clearly in FIG. 21. The channels 69 carry cross pins on which rear ends of links 72 are respectively pivotally mounted, and the front ends of these links are formed with openings which pivotally receive pins 73 which are respectively fixed to blocks 74 fixedly carried by the actuating means 49 at the upper surface of the horizontal wall thereof. Thus, as is apparent from FIG. 21, swinging of the foot lever 68 will result in displacement of the actuating means 49, the movement between the foot lever and actuating means being transmitted by the links 72. It is possible to connect to the foot lever 68 one or more springs or the like which enable it to yieldably assume an intermediate neutral position or, if preferred, it may automatically yieldably assume one or the other of the end positions of the rail 49.

Instead of a foot lever it is also possible to provide a hand lever, as shown in FIG. 22. The hand lever 83 is horizontally swingable about a vertical pivot 84 carried by a suitable bracket fixed to the bed 44, and a bolt 85 fixed to the lever 83 extends through a suitable opening formed in a horizontal shiftable bar 86 so that the latter can move to the left and right in the guide 87, as shown by the double headed arrow in FIG. 22. This horizontally shiftable bar 86 carries a pin 88 which extends upwardly through an elongated horizontal slot 89, formed in the bed 44 and extending parallel to the bar 86, as well as upwardly through the curved actuating slot 90, beneath which the slot 89 in the bed 44 is situated, as shown in FIG. 22. Thus, as the operator swings the actuating lever 83 to the right or left, as shown by the double headed arrow at the upper left of FIG. 22, the bar 86 will shift to the right or left and the pin 88 will ride to the right or left in the slot 89 of the bed 44. On the other hand, because the slot 90 of the actuating means 49 of this embodiment has forward and rearward end portions connected by an inclined intermediate section, as shown in FIG. 22, the lateral movement of the pin 88 will cause the angle iron 49 to be displaced forwardly or rearwardly, so that in this way the structure of FIG. 22 can be used to drive the actuating means 49. FIG. 22 also shows a clamp 82 by means of which it is possible to clamp the assembly shown in FIG. 22 on a suitable support. As is also apparent from FIGS. 21 and 22, the front wall 46 of the rail 45 may have upwardly directed slotted extensions 101. These extensions may be situated at the opposed ends of the wall 46 for supporting any desired accessories.

*Yarn suspending means*

A supporting rail 75 is provided to carry the suspending means 31, 32. This elongated rail or bar 75 is mounted on a pair of forwardly projecting arms 76. The left arm 76 of the apparatus is indicated in FIGS. 21 and 22. These arms 76 are fixed to and project forwardly from the bed 44, in the manner shown most clearly in FIG. 22. Each arm 76 fixedly carries an upwardly directed pin 77 received in the vertical bore of a slide member 78 which is vertically slidable along each pin 77, and each slide member 78 carries a set screw 79 capable of being turned into and out of engagement with the pin 77 for releasably fixing the slide member 88 at a selected elevation along the pin 77. The pair of slide members 78, of which only the left one is shown in FIG. 21, are respectively fixed to the opposed ends of the supporting rail 75 to make it possible to adjust the elevation of the rail 75. Thus, after the screws 79 have been loosened, it is possible to situate the rail 75 together with the slide members 78 fixed to the ends thereof at a selected elevation, and then the set screws 79 can be tightened to maintain the rail 75 at the selected elevation. The rail 75 fixedly carries upwardly directed positioning pins 80 which are respectively received in openings formed in the bar 31 of the suspending means so that, when the bar 31 is mounted on the bar 75, the bar 31 will be precisely positioned longitudinally while at the same time being easily removable from and replaceable on the bar 75.

The apparatus of the invention may also be used in the case where, instead of providing a plurality of pile yarns combined into a pile yarn unit, individual pile yarns are placed on the machine to be tied and knotted to the yarn of a woven fabric. In order to be able to use the apparatus for such purposes, it is only necessary to exchange the suspending means 31, 32 for another type of suspending means which will have a construction suited to the particular type of pile yarns which are to be combined with the woven fabric.

By way of example, FIGS. 25 and 26 show another possible embodiment of a suspending means, according to the present invention, for carrying the pile yarns in a suspended condition in preparation for being tied and knotted to the woven fabric in the manner described above. The suspending means of FIGS. 25 and 26 includes an elongated bar 110 adapted to be carried by the rail 75 and fixedly carrying springy fingers 111. The fingers 111 are arranged in pairs projecting forwardly from the front face of the bar 110 with the outer ends of each pair of springy fingers flaring away from each other, as shown most clearly in FIG. 26. Thus, the suspending means of FIGS. 25 and 26 includes pairs of leaf springs which coact to form the pairs of springy fingers 111 indicated in FIGS. 25 and 26. Rearwardly of their outwardly flaring ends, each pair of springy fingers 111 is provided with inner serrations, as indicated in FIG. 26, so that a pair of serrated surfaces are directed toward each other at each pair of coacting spring fingers 111.

Thus, with this construction it is only necessary to introduce the individual pile yarns into the pairs of springy fingers 111 which will be their own resiliency clamp against the pile yarns holding them reliably not only due to the clamping force but also due to the serrations. In addition, the outwardly flaring ends of each pair of fingers 111 provide the clamping unit with an entrance end which is of funnel-shaped configuration, giving the operator considerable convenience in introducing a pile yarn between a pair of spring fingers. As is apparent from FIG. 26, the bar 110 is formed with openings 112 which are adapted to receive, respectively, the pins 80 which are fixed to and project upwardly from the rail 75, so that the bar 110 coacts with the rail 75 in the same way as the bar 31. The pairs of coacting springy fingers 111 are distributed in a row in the same distribution as the tying needles 33 and thus in the same distribution as the meshes in any given row of meshes of the woven fabric to which the pile yarns are to be tied and knotted. Once the several pile yarns are individually mounted on the suspending means 110, 111, these pile yarns, hanging from the pairs of springy fingers 111, are in a position to have the above-described tying and knotting method of the invention performed thereon.

However, it is also possible to connect the individual pile yarns to the suspending means 110, 111 in advance of placing the latter on the machine. With this embodiment, the method of the invention is precisely the same as that described above, except that instead of a suspending means 31, 32, the suspending means 110, 111 is used. It is possible to charge the suspending means 110, 111, in advance of placing the latter on the machine, with a plurality of precut pile yarns, cut from yarn which is readily available on the market, so that the precharged suspending means can be placed on the machine, with the yarns hanging therefrom.

Particular use will be made of the embodiment of FIGS. 25 and 26 when pile yarn units of the type described above in connection with FIGS. 2–3 are not available or in those cases where the colors of the pile yarns in an individual row follow one another in a haphazard manner. In such case, it is worthwhile to suspend the different pile yarns of different colors individually from the suspending means. Furthermore, the particular type of suspending means shown in FIGS. 25 and 26 may be used with considerable advantage where the work is performed at home, so that children, for example, can aid in the operations by charging a plurality of suspending means 110, 111 before the latter are mounted on the machine. In this case, there will be a large number of the suspending means 110, 111 which can be charged with pile yarns so as to be maintained in readiness at the beginning of the operations. Thus, either before or during the operation, it is possible to precharge the suspending means 110, 111 with the pile yarns required for the individual rows, and in some cases it may be possible to have on hand sufficient suspending means for an entire field of the pile fabric which is to be manufactured, such as for an entire area of a given rug or carpet.

What is claimed is:

1. In the manufacture of pile fabrics, the method of connecting at least one pile yarn to a woven fabric which has a yarn extending between and separating a pair of adjoining meshes of the woven fabric, comprising the steps of placing the pile yarn partly around a tying needle with an intermediate portion of the pile yarn extending around one side of the needle and with a pair of elongated portions of the pile yarn extending from said intermediate portion thereof past said needle to the opposite side thereof, inserting the needle through the adjoining meshes of the woven fabric with the yarn thereof which extends between and separates said adjoining meshes engaging said opposite side of said needle, bringing said elongated portions of said pile yarn across said yarn of said woven fabric and connecting said elongated portions of said pile yarn to said needle at a side of said woven fabric yarn which is opposed to that side thereof where said intermediate portion of said pile yarn is located, and stripping said fabric yarn from said needle and along said elongated portions of said pile yarn connected to said needle, thus pulling said intermediate portion of said pile yarn from said needle and along the elongated portions of the pile yarn, with said elongated portions partly surrounded by said intermediate portion of the pile yarn and forming loops extending from said intermediate portion of said pile yarn completely around and beyond the woven fabric yarn, and pulling said fabric yarn to knot the pile yarn tightly thereon, with the elongated portions of the pile yarn extending from the knotted portions of the pile yarn to form at least part of a pile extending from the woven fabric.

2. The method of claim 1 and wherein said woven fabric yarn is a filling yarn thereof.

3. The method of claim 2 and wherein said elongated portions of said pile yarn are disconnected from said needle after said filling yarn is stripped from said needle.

4. The method of claim 2 and wherein said pile yarn has free ends and wherein tapes are respectively fixed to said free ends of said pile yarn, said tapes being stripped from said free ends of said pile yarn by said filling yarn of said woven fabric.

5. The method of claim 2 and wherein said needle includes a gripping means for gripping the pile yarn at the portions connected to said needle and said gripping means being displaceable between an open, non-gripping position and a closed, gripping position, the steps of introducing the elongated portions of said pile yarn, after bringing them across said woven fabric yarn, into the gripping means while the latter is in its open, non-gripping position, then displacing said gripping means to its closed gripping position for gripping the elongated portions of the pile yarn to connect the latter with the needle.

6. The method of claim 5 and wherein said gripping means is displaced back to its open, non-gripping position after the tying of the pile yarn.

7. The method of claim 2 and wherein said filling yarn extends between and separates two rows of meshes of the woven fabric with the meshes of one row adjoining and being aligned with the meshes of the other row and wherein a plurality of said tying needles are arranged in a row in which the needles are spaced from each other by spaces corresponding to the distance between the succesive meshes of each row of the woven fabric, the steps of placing a plurality of said pile yarns around said needles, respectively, inserting said needles respectively through the adjoining meshes of said rows so that said filling yarn extends along the row of needles engaging the sides thereof which are opposite from the sides of said needles around which said intermediate portions of said pile yarns extend, bringing all of the elongated portions of all of the pile yarns across the filling yarn and respectively connecting the elongated portions of the several pile yarns to the tying needles, respectively, and simultaneously stripping said filling yarn from said plurality of needles for simultaneously tying and knotting the plurality of pile yarns to said filling yarn of said woven fabric.

8. In an apparatus for manufacturing a pile fabric, a row of tying needles to be used in connection with the tying and knotting of pile yarns to a filling yarn of a woven fabric, and elongated suspending means extending along the row of tying needles and situated at an elevation higher than the latter for carrying a plurality of pile yarns in a condition suspended from said suspending means and hanging downwardly from the latter to said needles preparatory to being tied and knotted to a woven fabric.

9. The combination of claim 8 and wherein said suspending means includes an elongated bar and a plurality of pins fixed to and projecting from said bar and arranged in a row which is at least substantially parallel to the row of needles, so that the pile yarns can be hung from said pins of said suspending means.

10. The combination of claim 8 and wherein said suspending means includes an elongated bar and a plurality of springy gripping fingers fixed to and projecting from said bar and arranged in pairs so that each pair of gripping fingers can grip a pile yarn, said pairs of gripping fingers being arranged in a row which extends at least substantially parallel to the row of tying needles so that the pile yarns can be gripped by said fingers and hang therefrom down to the tying needles.

11. The combination of claim 8 and wherein each tying needle includes an elongated tubular casing, a plunger situated at least partly within and being longitudinally shiftable along the interior of said casing, and a pair of elongated springy hook members fixed to said plunger and projecting therefrom through and beyond an end of said tubular casing, said springy hook members being directed toward each other and assuming in their unstressed condition an open position where they are displaced from each other and extend laterally beyond said end of said casing, said plunger being displaceable together with said springy hook members with respect to said casing to a position where said end of said casing cams said springy hook members toward each other into a closed, yarn-gripping position.

12. The combination of claim 11 and wherein said springy hook members include a narrow hook member and a wide hook member which is wider than said narrow hook member, said wider hook member being formed of a wire which is bent backwardly upon itself so as to have a pair of elongated wire portions which are substantially coextensive and which are connected to said plunger, said wire portions of said wider hook member being spaced from each other by a distance sufficiently great to receive a narrow hook member, so that with a plurality of said needles situated in a row relatively close to each other and with said hook members in their open positions, the narrow hook member of one needle can extend into the space between the elongated wire portions of the wider hook member of an adjoining needle.

13. The combination of claim 11 and wherein said springy hook members of each needle are arranged in a common plane, said row of needles being situated in one plane and said common plane being inclined with respect to said one plane, and the pairs of hook members of adjoining needles overlapping each other so that the needles can be located close together in said row without any engagement or interference in the movement of said hook members of one needle by the hook member of an adjoining needle.

14. The combination of claim 11 and wherein a means coacts with said plunger and casing for preventing turning of said plunger with respect to said casing while freeing said plunger for longitudinal movement with rsepect to said casing.

15. The combination of claim 11 and wherein a support means supports the row of casings of said needles in a stationary position, actuating means located adjacent said plungers and said support means for moving said plungers with respect to said casings, drive means operatively connected to said actuating means for moving the latter, and a plurality of spring means respectively connecting said plungers to said actuating means for transmitting movement of said actuating means to said plungers while providing for yieldable movement of said actuating means with respect to said plungers.

References Cited

UNITED STATES PATENTS

| | | | |
|---|---|---|---|
| 2,292,995 | 8/1942 | Greenwall | 161—143 X |
| 2,814,301 | 11/1957 | Schmitz | 112—79.5 X |
| 3,318,623 | 5/1967 | Barroso | 289—1.5 |

FOREIGN PATENTS

| | | |
|---|---|---|
| 697,699 | 11/1930 | France. |
| 231,053 | 10/1909 | Germany. |
| 20,261 | 10/1894 | Great Britain. |
| 242,376 | 11/1925 | Great Britain. |

LOUIS K. RIMRODT, *Primary Examiner.*

U.S. Cl. X.R.

289—18